United States Patent
Shen et al.

(10) Patent No.: US 9,326,103 B2
(45) Date of Patent: Apr. 26, 2016

(54) INDOOR LOCATION-FINDING USING MAGNETIC FIELD ANOMALIES

(71) Applicant: Microsoft Technology Licensing, LLC, Redmond, WA (US)

(72) Inventors: Guobin (Jacky) Shen, Beijing (CN); Chunshui Zhao, Beijing (CN); Feng Zhao, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 13/941,002

(22) Filed: Jul. 12, 2013

(65) Prior Publication Data

US 2015/0018018 A1 Jan. 15, 2015

(51) Int. Cl.
*H04W 4/04* (2009.01)
*G01C 21/00* (2006.01)
*G01C 21/08* (2006.01)
*G01C 21/20* (2006.01)

(52) U.S. Cl.
CPC .............. *H04W 4/04* (2013.01); *G01C 21/005* (2013.01); *G01C 21/08* (2013.01); *G01C 21/206* (2013.01)

(58) Field of Classification Search
CPC ........................................................ H04W 4/04
USPC .......... 455/456.1, 456.2, 456.3, 456.5, 456.6, 455/457
See application file for complete search history.

(56) References Cited

U.S. PATENT DOCUMENTS

| 8,284,100 | B2 | 10/2012 | Vartanian et al. | |
| 2006/0125644 | A1 | 6/2006 | Sharp | |
| 2012/0143495 | A1 | 6/2012 | Dantu | |
| 2012/0203453 | A1* | 8/2012 | Lundquist et al. | 701/434 |
| 2012/0232838 | A1 | 9/2012 | Kemppi et al. | |
| 2012/0290254 | A1* | 11/2012 | Thrun et al. | 702/150 |
| 2013/0065611 | A1* | 3/2013 | Park | G01S 5/18 455/456.2 |
| 2013/0083216 | A1* | 4/2013 | Jiang et al. | 348/223.1 |
| 2013/0150076 | A1* | 6/2013 | Kim et al. | 455/456.1 |
| 2013/0303185 | A1* | 11/2013 | Kim et al. | 455/456.1 |
| 2014/0073345 | A1* | 3/2014 | Chintalapudi | G01C 21/165 455/456.1 |
| 2014/0141796 | A1* | 5/2014 | Marti et al. | 455/456.1 |
| 2014/0273918 | A1* | 9/2014 | Gilbert et al. | 455/404.2 |

(Continued)

OTHER PUBLICATIONS

"Amazon Mechanical Turk", Retrieved on: Apr. 30, 2013, Available at: https://www.mturk.com/mturk/welcome 1 page.

(Continued)

*Primary Examiner* — Christopher M Brandt
(74) *Attorney, Agent, or Firm* — Steve Wight; Sandy Swain; Micky Minhas (57) ABSTRACT

Techniques for indoor location-finding are described herein. Inside buildings, anomalies in the Earth's magnetic field may be caused by the buildings' structures. These anomalies tend to be location specific and temporally stable. Accordingly, a database or map may be constructed of field strength measurements, and made available to clients, either online (e.g., through cloud services) or offline. As a user carrying a portable device walks within a building, magnetic field measurements may be made. The measurements may be configured in as vectors and compared to the database. A specific location may be indicated by anomaly information seen in both the vector(s) and database. Optionally, techniques may be combined with a particle filter that may be operated step-by-step as the user moves within the building. In another option, fusion with Wi-Fi signals may be performed, such as with a two-pass bidirectional particle filtering.

20 Claims, 7 Drawing Sheets

(56) References Cited

U.S. PATENT DOCUMENTS

| | | | | |
|---|---|---|---|---|
| 2014/0274114 | A1* | 9/2014 | Rowitch | G01S 19/46 455/456.1 |
| 2014/0335893 | A1* | 11/2014 | Ronen | 455/456.1 |
| 2015/0133165 | A1* | 5/2015 | Park | H04W 4/02 455/456.3 |

OTHER PUBLICATIONS

"Ambient Magnetic Field-Based Indoor Location Technology", In White Paper of IndoorAtlas Ltd., Jul. 2012, 5 pages.

Angermann, et al., "FootSLAM: Pedestrian Simultaneous Localization and Mapping Without Exteroceptive Sensors—Hitchhiking on Human Perception and Cognition", In Proceedings of the IEEE, vol. 100, May 13, 2012, 9 pages.

Bahl, et al., "Radar: An In-Building RF-Based User Location and Tracking System", In Nineteenth Annual Joint Conference of the IEEE Computer and Communications Societies, vol. 2, Mar. 26, 2000, 10 pages.

Chen, et al., "FM-Based Indoor Localization", In Proceedings of the 10th International Conference on Mobile Systems, Applications, and Services, Jun. 25, 2012, 13 pages.

Chintalapudi, et al., "Indoor Localization without the Pain", In Proceedings of the Sixteenth Annual International Conference on Mobile Computing and Networking, Sep. 20, 2010, 12 pages.

Chung, et al., "Indoor Location Sensing Using Geo-Magnetism", In Proceedings of the 9th International Conference on Mobile Systems, Applications, and Services, Jun. 28, 2011, 14 pages.

Constandache, et al., "Towards Mobile Phone Localization without War-Driving", In Proceedings of the 29th Conference on Information Communications, Mar. 14, 2010, 9 pages.

Dhondge, et al., "Energy-Efficient Cooperative Opportunistic Positioning for Heterogeneous Mobile Devices", In 21st International Conference on Computer Communications and Networks, Jul. 30, 2012, 6 pages.

Fox, Dieter, "KId-Sampling: Adaptive Particle Filters", In Proceedings of Advances in Neural Information Processing Systems, Dec. 3, 2001, 8 pages.

Haverinen, et al., "A Global Self-Localization Technique Utilizing Local Anomalies of the Ambient Magnetic Field", In Proceeding of IEEE International Conference on Robotics and Automation, May 12, 2009, 6 pages.

Hong, et al., "SEPTIMU: Continuous In-Situ Human Wellness Monitoring and Feedback Using Sensors Embedded in Earphones", In Proceedings of the 11th International Conference on Information Processing in Sensor Networks, Apr. 16, 2012, 2 pages.

Ivanov, Rosen, "Indoor Navigation System for Visually Impaired", In International Conference on Computer Systems and Technologies, Jun. 17, 2010, 7 pages.

Kim, et al., "Indoor Positioning System Using Geomagnetic Anomalies for Smartphones", In International Conference on Indoor Positioning and Indoor Navigation, Nov. 13, 2012, 5 pages.

Klingbeil, et al., "A Wireless Sensor Network for Real-Time Indoor Localisation and Motion Monitoring", In Proceedings of the 7th International Conference on Information Processing in Sensor Networks, Apr. 22, 2008, 12 pages.

Kothari, et al., "Robust Indoor Localization on a Commercial Smart-Phone", In Technical Report, CMU-RI-TR-11-27, Robotics Institute, Carnegie Mellon University, Aug. 2011, 11 pages.

Li, et al., "A Reliable and Accurate Indoor Localization Method Using Phone Inertial Sensors", In Proceedings of the ACM Conference on Ubiquitous Computing, Sep. 5, 2012, 10 pages.

Li, et al., "How Feasible is the Use of Magnetic Field Alone for Indoor Positioning?", In Proceedings of the International Conference on Indoor Positioning and Indoor Navigation, Nov. 13, 2012, 9 pages.

"LSM330DLC", Published on: Sep. 2012, Available at: http://www.st.com/st-web-ui/static/active/en/resource/technical/document/datasheet/DM00037200.pdf 66 pages.

"Monsoon.Solutions.Inc. Power Monitor", Retrieved on: May 1, 2013, Available at: http://www.msoon.com/LabEquipment/PowerMonitor/ 1 page.

"MSP430x1xx Family", Retrieved on: May 1, 2013, Available at: http://www.ti.com/lit/ug/slau049f/slau049f.pdf 414 pages.

"North East Down", Retrieved on: May 1, 2013, Available at: http://en.wikipedia.org/wiki/North_East_Down 1 page.

Paek, et al., "Energy-Efficient Positioning for Smartphones Using Cell-ID Sequence Matching", In Proceedings of the 9th International Conference on Mobile Systems, Applications, and Services, Jun. 28, 2011, 14 pages.

Priyantha, et al., "Enabling Energy Efficient Continuous Sensing on Mobile Phones with Littlerock", In Proceedings of the 9th ACM/IEEE International Conference on Information Processing in Sensor Networks, Apr. 12, 2010, 2 pages.

Rai, et al., "Zee: Zero-Effort Crowdsourcing for Indoor Localization", In Proceedings of the 18th Annual International Conference on Mobile Computing and Networking, Aug. 22, 2012, 12 pages.

Riehle, et al., "Indoor Magnetic Navigation for the Blind", In 34th Annual International Conference of the IEEE Engineering in Medicine and Biology Society, Aug. 28, 2012, 4 pages.

"Smith Waterman Algorithm", Retrieved on: May 1, 2013, Available at: http://en.wikipedia.org/wiki/Smith-Waterman_algorithm 5 pages.

Storms, et al., "Magnetic Field Navigation in an Indoor Environment", In Proceedings of Ubiquitous Positioning Indoor Navigation and Location Based Service, Oct. 14, 2010, 10 pages.

Suksakulchai, et al., "Mobile Robot Localization Using an Electronic Compass for Corridor Environment", In IEEE International Conference on Systems, Man, and Cybernetics, vol. 5, Oct. 8, 2000, 6 pages.

Truong, Loc, "Low Power Consumption and a Competitive Price Tag Make the Six-Core TMS320C6472 Ideal for High-Performance Applications", Published on: Oct. 2009, Available at: http://www.ti.com/lit/wp/spry130/spry130.pdf 9 pages.

"Wall Follower", Retrieved on: May 1, 2013, Available at: http://en.wikipedia.org/wiki/Maze_solving_algorithm 5 pges.

Wang, et al., "No Need to War-Drive: Unsupervised Indoor Localization", In Proceedings of the 10th International Conference on Mobile Systems, Applications, and Services, Jun. 25, 2012, 14 pages.

Woodman, et al., "Pedestrian Localisation for Indoor Environments" ACM Sep. 21-24, 2008; 10 pages.

Yang, et al., "Locating in Fingerprint Space: Wireless Indoor Localization with Little Human Intervention", In Proceedings of the 18th Annual International Conference on Mobile Computing and Networking, Aug. 22, 2012, 12 pages.

Youssef, et al., "The Horus WLAN Location Determination System", In Proceedings of the 3rd International Conference on Mobile Systems, Applications, and Services, Jun. 6, 2005, 14 pages.

Zhou, et al., "IODetector: A Generic Service for Indoor Outdoor Detection", In Proceedings of the 10th ACM Conference on Embedded Network Sensor Systems, Nov. 6, 2012, 14 pages.

* cited by examiner

INDOOR LOCATION-FINDING USING MAGNETIC FIELD ANOMALIES

BACKGROUND

Indoor location-finding is more difficult than outdoor location-finding, in part because outdoor location-finding may rely on the highly accurate global positioning system (GPS). Indoor location-finding frequently relies on radio techniques, including utilization of Wi-Fi and/or cellular phone signals. However, Wi-Fi signals are highly fluctuating and severely affected by the physical layout of the internal environment, and therefore do not provide precision location information. Similarly, due to the large coverage area of cellular base stations, the margin of error in cellular signal triangulation techniques may be larger than the entire building, and therefore may not provide the desired accuracy.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Techniques for indoor location-finding are described herein. Such techniques are invaluable, for example, in guiding people within malls, office buildings, airports and parking garages. Inside buildings, anomalies in the Earth's magnetic field may be caused by the building's structure. The indoor geomagnetic field, including anomalies, tends to be location specific and temporally stable. Accordingly, a map, database or data structure may be constructed using the field strength measurements. For example, a map may be configured in grayscale (or other gradient) to represent varying degrees of magnetic field strength within various locations in an indoor floor plan. The map or database may be made available to clients, such as users of cell phones or other portable devices within a building. The database or map may be downloaded and available offline to a client device. Alternatively or additionally, the database or map may be available online (e.g., through cloud services) to users.

To determine a user's location within a building, a cell phone or other portable device may make magnetic field measurements at a plurality of locations. The measurements may be configured as one or more vectors and compared to the map or database. In one example, a specific location of the user may be indicated by the user's position with respect to magnetic field anomaly information described in the map or database.

To create the map or database, a user carrying a cell phone may walk along a pre-planned survey path from a starting point to an ending point. The phone may record data from both a magnetometer and an inertial measurement unit (IMU). A trace of the user's estimated actual path may be compared to the intended path, and magnetic field strength measurements may be positioned within the map or database. In one example, a map may be configured in grayscale (a color scale, gradient or other data storage means) to show magnetic field strength. The map or database may then be made available to mobile devices within the building, in an online and/or offline manner.

Example System and Techniques

Figure 1:
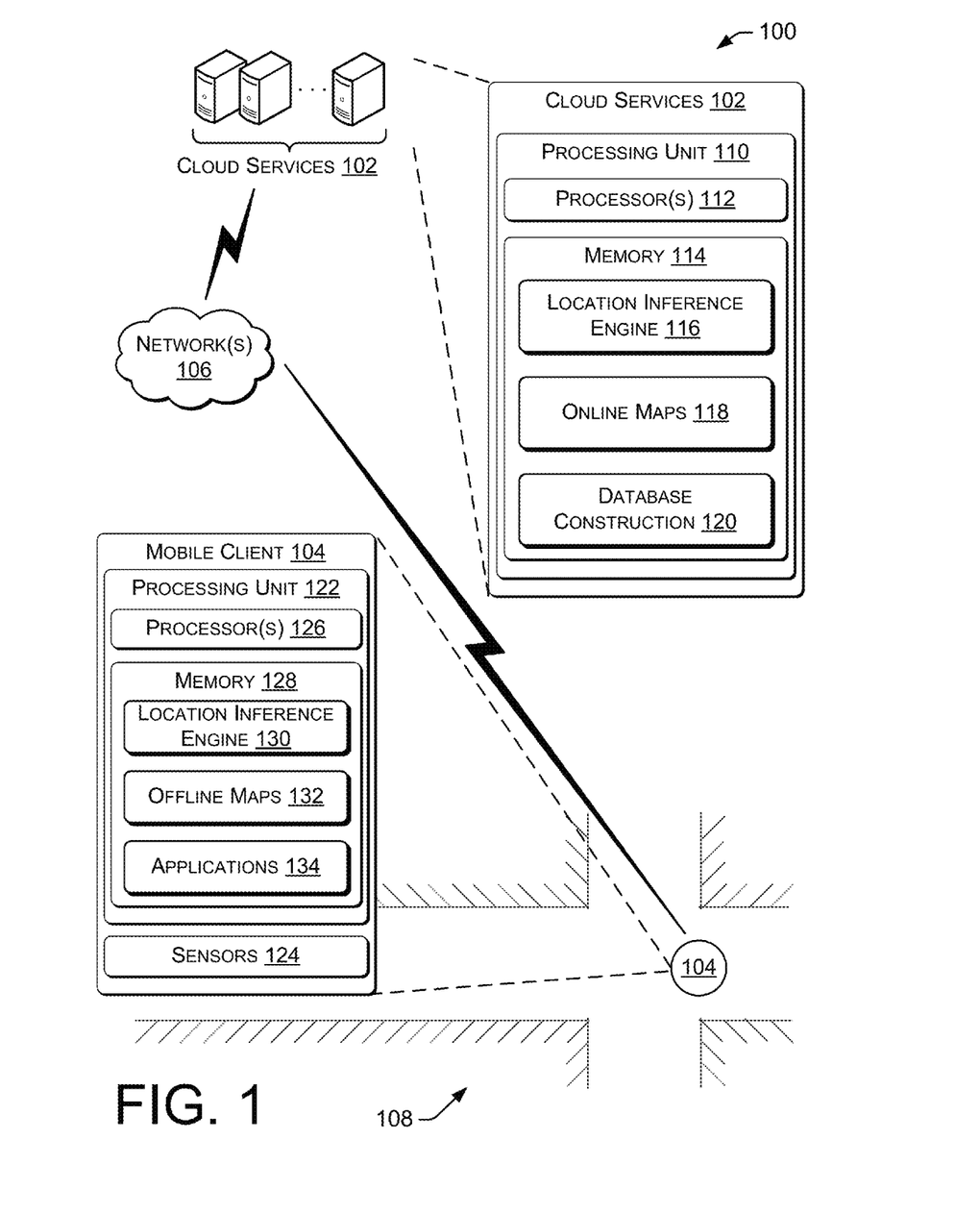
FIG. 1 is a schematic diagram of an example indoor location-finding architecture, including a mobile client at an indoor location shown by a partial floor plan and cloud services in communication with the mobile device over a network.

FIG. 1 is a schematic diagram of an example indoor location-finding architecture 100. In one example, the location finding architecture 100 leverages anomalies in magnetic field strength within a building or other structure for use in location finding of a mobile client. The geomagnetic field is globally available, and may be leveraged as a pervasive positioning tool without depending on any infrastructure. Within the example architecture 100, cloud services 102 communicate with a mobile client 104 through a network 106. The network 106 may include a number of component networks, which may be wired and/or wireless, and may include Wi-Fi network(s), cellular network(s), the Internet, etc. The mobile client 104 may be located within an indoor environment, such as a shopping mall, office building, library, parking garage, hospital, university, airport terminal, etc. In the example architecture 100, the mobile client 104 is shown within hallways indicated by the floor plan 108. Thus, the architecture 100 shows example techniques by which the cloud services 102 may assist the mobile client 104, and by which a location of the mobile client may be determined.

Figure 2:
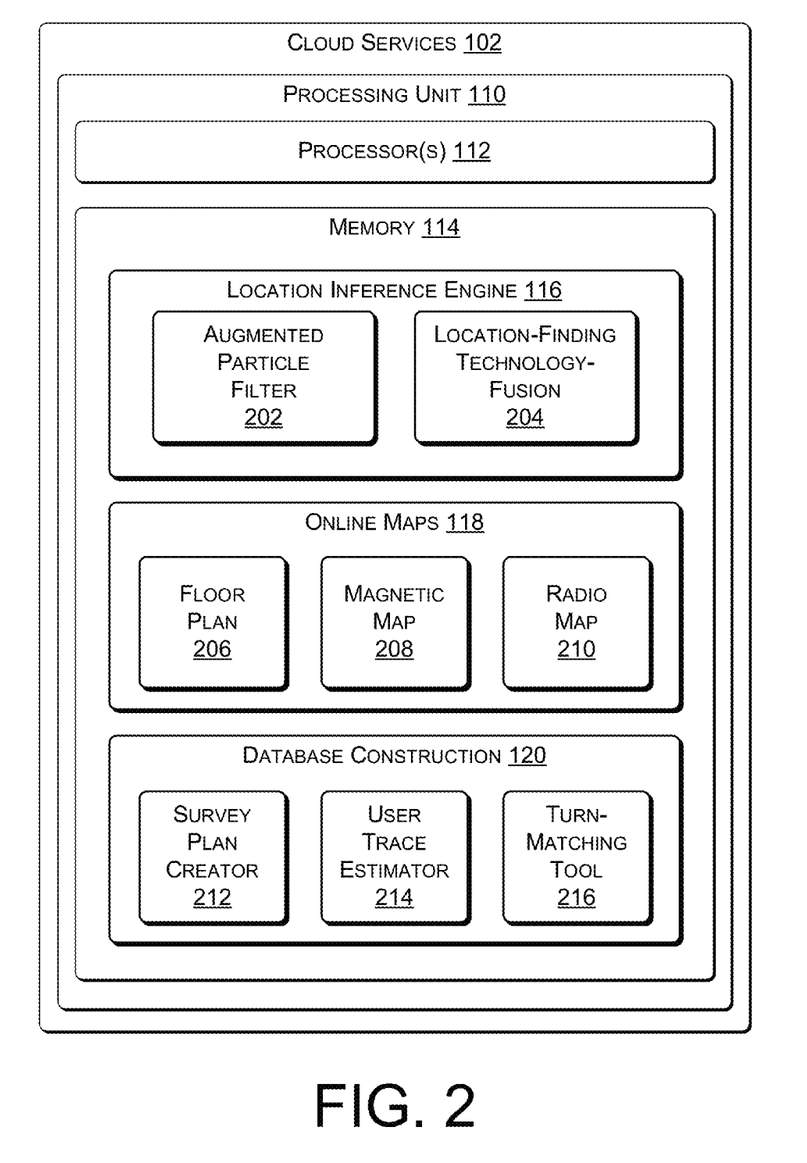
FIG. 2 is a block diagram showing detail of an example implementation of the cloud services.

The example cloud services 102 may include a processing unit 110, which may include one or more processors 112 and one or more memory devices 114. The memory 114 may include instructions for one or more applications, programs, procedures and/or software routines that provide various services to the client. The functional divisions are arbitrary, and are provided for illustration only. Thus, other arrangements of the cloud service's functionality could be configured. In the example shown, the cloud services include a location inference engine 116, online maps 118 and a database construction procedure 120. FIG. 2 provides greater example detail of cloud services.

Figure 3:
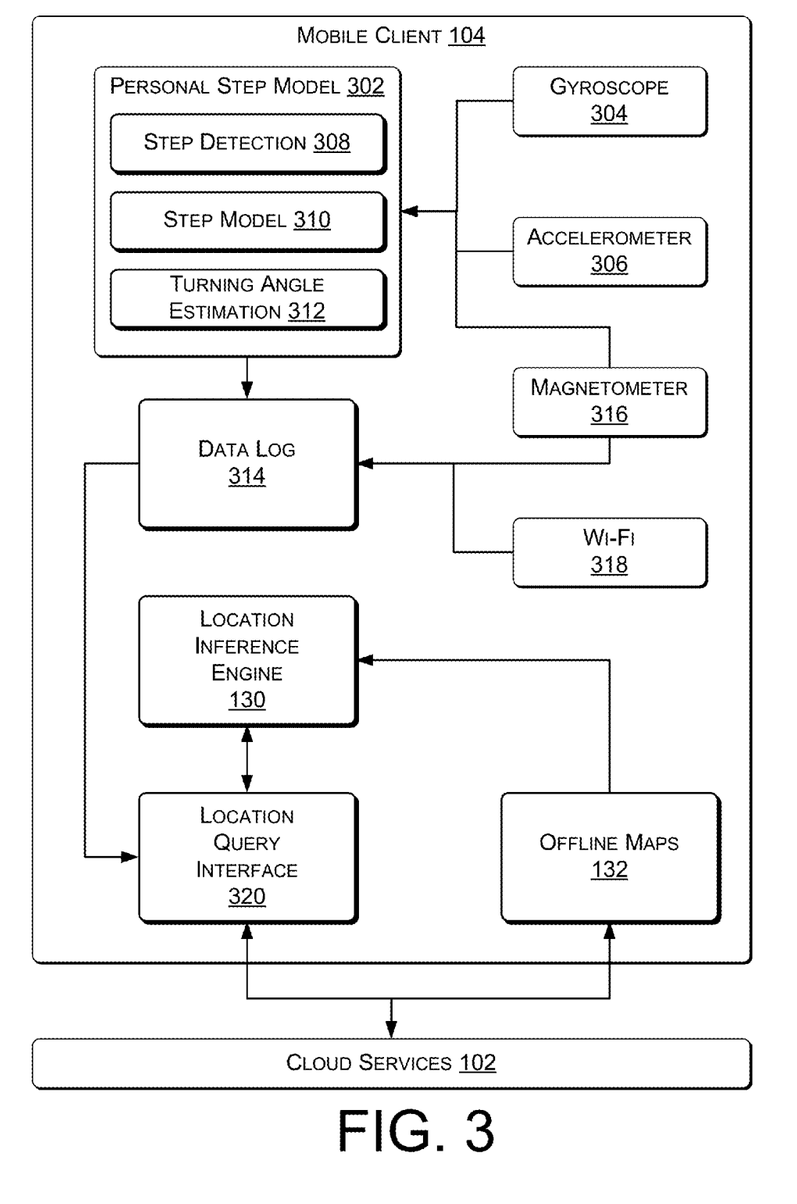
FIG. 3 is a block diagram showing detail of an example implementation of the mobile client.

The example mobile client 104 may include a processing unit 122 and one or more sensors 124. The mobile devices 104 may include cellular phones, tablets, laptop computers or other mobile computing devices. Examples of sensors 124 include a magnetometer, gyroscope, accelerometer or other sensor device, etc. The processing unit 122 may include one or more processors 126 or application specific integrated circuits (ASICs) and one or more memory devices 128. The memory devices 128 may include instructions for one or more applications, programs, procedures and/or software routines that perform various functions. As noted with respect to the cloud services, the functional divisions of applications, subroutines and/or procedures on the mobile client are arbitrary. Accordingly, the example provided is for illustration only and other arrangements of the mobile client functionality could be configured. In the example shown, a location inference engine 130 is configured to receive one or more inputs and to estimate or determine a location of the mobile client 104. Offline maps 132 may be used, particularly in the event that online maps 118 are not available. Additionally, one or more applications, subroutines and/or procedures 134 may be provided. FIG. 3 provides greater example detail of a mobile client.

Example Cloud Services

FIG. 2 is a block diagram showing detail of an example implementation of the cloud services 102. While alternative design techniques could be utilized to achieve similar results, in the example shown three subsystems within the cloud services are defined, including a location inference engine 116, online maps 118 and database construction procedure/application 120.

The location inference engine 116 is configured to determine and/or assist in a determination of a location of the mobile client. Location inference engines based on the same or similar technology may be located in both the cloud services 102 and the mobile client 104. The location inference engine 116 located in cloud services 102 may be adapted for an online mode (i.e., the client 104 is online). In one example, the location inference engine 116 may resolve a location of the mobile client by matching received magnetic signals against the online maps 118. Additionally, an augmented particle filter 202 and location-finding technology-fusion module 204 may be used to assist in the location-finding.

Figure 4:
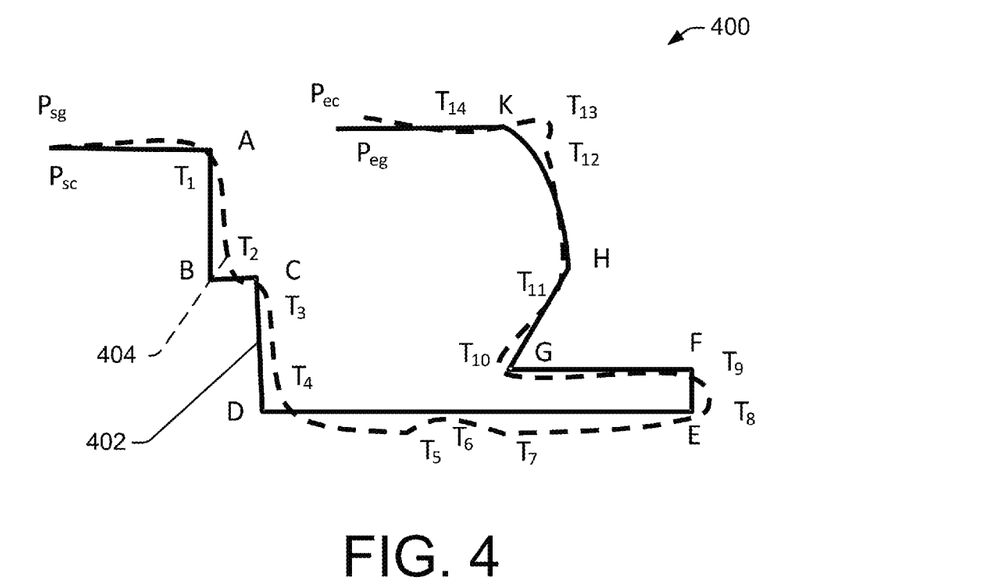
FIG. 4 is a schematic diagram showing aspects of map construction and turn detection.
Figure 5:
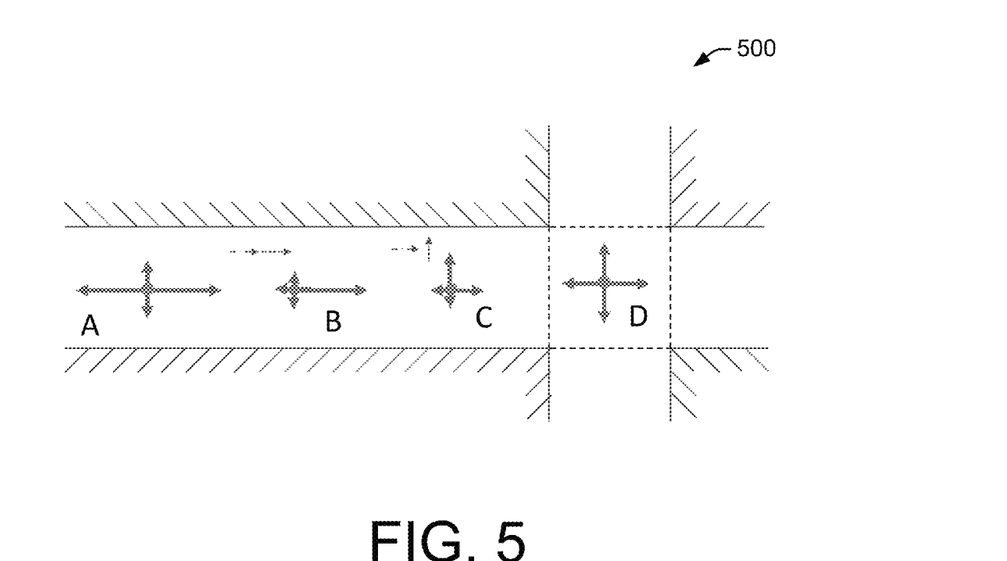
FIG. 5 is a schematic diagram showing aspects of a state update model in particle filtering.

The augmented particle filter 202 may implement a particle motion model, such as that discussed with respect to FIG. 5, to perform aspects of location-finding. In one example, the particle motion model may utilize particle filtering in a tracking-based approach to location-finding. In one example, the augmented particle filter 202 may execute a step-by-step process. That is, as the mobile client moves under the step-by-step walking process of an actual user, the augmented particle filter 202 provides updated information. These and other techniques will be discussed with respect to FIGS. 4-7.

The location inference engine 116 may opportunistically receive available signals in addition to magnetic field strength information. To benefit from these available signals, the location-finding technology-fusion application or procedure 204 may combine two or more location-finding technologies in a synergistic manner. In one example, location technology fusion application 204 may fuse Wi-Fi location-finding technology with magnetic field based location-finding technology. The Wi-Fi signals may be readily available and may provide information not found in magnetic field strength measurements. Information from such received signals may be combined and/or fused with, or analyzed in parallel with, other information obtained by operation of a magnetic field-based localization process.

By using the augmented particle filter 202, the location-finding technology-fusion application 204 and/or other techniques or applications, the location inference engine 116 operates within cloud services 102 to determine a location of a mobile client 104.

The online maps 118 may be made available over networks (e.g., the Internet) to one or more mobile clients 104. The online maps 118 may include one or more maps and/or databases configured to store information helpful to the location-finding techniques used by the location inference engine 116. Example online maps 118 include a floor plan 206, a magnetic map 208 and/or a radio map 210. The floor plan 206 may describe one or more indoor facilities, such as shopping malls, parking garages, hospitals, university buildings, airports and/or any other structure that may be difficult for users to navigate (e.g., such as by walking, elevators, escalators, moving sidewalks and the like). The floor plan 206 may be configured as an image, database, data structure or any other information format or according to any desired techniques.

A magnetic map 208 may be configured to store information about magnetic fields, such as field strength and/or direction (e.g., "north"). The magnetic information may be associated with locations within indoor structures, such as those represented by the floor plans 206. The magnetic map 208 may be configured as a grayscale image (or color scale image, gradient or other information-containing data structure) based at least in part on the floor plan 206. Alternatively, the magnetic map 208 may be configured as a database, data structure or any other information format, such by using vectors or scalar values, or according to any desired techniques or technologies.

A radio map 210 may be configured to store information about radio signals, such as Wi-Fi signals, cellular signals, near field communications signals and other radio frequency (RF) signals. The radio map 210 may associate the radio information with locations within indoor structures, such as those represented by the floor plans 206. Alternatively, the radio map 210 may be configured as a database, data structure or any other information format, such by using a list of two-element tuples consisting of the identifier of a Wi-Fi access point (AP) and the corresponding measurement of received signal strength, or according to any desired techniques or technologies.

The map or database construction subsystem 120 is configured to provide information and/or solutions to location-finding and database construction through efficient, compliant walking-based site surveying techniques and/or methods. In the example shown, the map or database construction subsystem 120 is configured using three modules, including a survey plan creator 212, a user trace estimator 214 and a turn matching tool 216.

The survey plan creator 212 may utilize one or more mobile devices in a process of creation of maps/databases and/or acquisition of data usable with location-finding techniques. A survey plan may be created using a venue map (e.g., a floor plan 206) that covers all paths of interest within the venue, building or complex. The survey plan may be created or generated manually or in an automated manner. Automated survey plan creation may be performed by following rules such as a right-hand or a left-hand wall follower rule. The actual survey plan may depend largely on the floor plan 206, and also on detail and particulars of the floor plan, such as hallway widths, room dimensions, etc. For example, a path may be defined in the middle of narrow pathways, whereas for wider corridors or open spaces, additional survey paths may be added that are parallel or otherwise separated. The survey plan creator 212 may be configured to create such a plan in a standardized or custom manner, based on the floor plan 206 or other input.

The user trace estimator 214 may utilize techniques including motion detection and "dead reckoning" to determine a location of a mobile client 104 during the database-constructing process. The turn-matching tool 216 may utilize techniques including inertial sensing and data processing to distinguish real turns from candidate turns (e.g., data indicating a possible turn) of a mobile device in motion with a walking user. Example techniques to implement the survey plan creator 212, the user trace estimator 214 and the turn-matching tool 216 may be understood from FIGS. 4-7 and associated discussion.

Example Mobile Client

FIG. 3 is a block diagram showing detail of an example implementation of the mobile client 104. In one implementation, a personal step model 302 is configured to receive input and to perform calculations based in part on a footstep pattern of a user. The example personal step model 302 is implemented by a step detection module 308, a step model 310 and a turning angle estimation module 312. Other implementations of the personal step model 302 could be configured according to differently segmented software and/or hardware devices. Using the personal step model 302, the amount of data obtained while performing map-making and/or database creation is made both more meaningful and more tractable by analyzing input upon each step of a user. In operation, the user may walk a survey route with the mobile client device 104 (e.g., a cell phone or other portable computing device). Inertial sensors such as a gyroscope 304, accelerometer 306 and/or a magnetometer 316 may provide input to the personal step model 302. The magnetometer 316 and/or gyroscope 304 and accelerometer 306 may be used in part to determine a footfall indicating each step, and to gather turn information to determine both distance and direction traveled by the mobile client 104.

A step detection procedure 308 is configured to detect individual steps of a surveyor, such as during a walk through all or part of a venue or along a survey path. The use of individual steps helps to define points at which data taken from the gyroscope 304, accelerometer 306, magnetometer 316 and/or Wi-Fi or other RF receiver 318 may be recorded.

The step model 310 may be configured to assist in map and/or database construction. The step model 310 provides a compliant-walking (i.e., step-based) data collection method. According to one example of the step model 310, a surveyor walks through all or part of a venue or according to a pre-planned survey path. The path may be walked from the starting point to the end point with the phone in fixed position relative to the surveyor's body (e.g., in a pocket). The step model 310 records inertial measurement unit (IMU) output data including acceleration, magnetometer and gyroscope readings. The IMU data may be used to determine a position of the surveyor along the survey path. In one example, the user trace (actual path of the user as the user walks the survey path) is estimated and matched against the pre-planned path at fixed locations associated with each step. Having established locations associated with steps (footfalls), and collected magnetic signals at those locations, data for other locations may be interpolated from data associated with neighboring step positions. Additionally, this location data may be combined with data describing magnetic fields and data describing Wi-Fi and/or other radio frequency (RF) signals obtained as the user walks the survey path.

The turning angle estimation module 312 identifies turns made by the surveyor walking through all or part of a venue (e.g., according to a pre-planned survey path). Turn estimation may be made by summing a plurality of angle changes. One example implementation of turn angle estimation is presented in FIG. 4 and associated discussion.

A data log 314 receives data from the personal step model 302 and a magnetometer 316 and Wi-Fi or other RF signal receiver 318. Accordingly, the data log 314 may contain data which relates location (e.g., location within a floor plan 206) to magnetic field data and/or RF radio data, etc. The data log 314 may be used to create the offline maps 132, such as by operation of the database construction application or procedure 120 of FIGS. 1 and 2.

A location inference engine 130 may be configured similarly to the online location inference engine 116 of the cloud services 102. In operation, the location inference engine 130 may utilize online maps 118 or offline maps 132 to determine a location of the mobile client 104.

A query location interface 320 may allow communication with the location inference engine 130 of the client device 104 and/or communication with the location inference engine 116 in the cloud services 102, and/or communication with applications that desire to retrieve the current location.

Map and Database Construction

FIG. 4 is a schematic diagram showing techniques of map construction, including surveying, walking trace estimation and trace matching. In one aspect, FIG. 4 shows a map 400 having a superimposed survey path (i.e., a planned path) 402 and an actual user path or user trace 404. A site survey may be utilized to gather information for map and/or database construction. In one example, the techniques describe herein allow ordinary mobile phone users to perform a site survey in a highly efficient manner. The techniques include data collection performed by a surveyor walking along a pre-planned survey path 402 from a starting point to an endpoint with a cell phone in fixed position relative to the surveyor (e.g., the surveyor may keep the phone in a pocket). In the example, execution of processor- or computer-readable statements defined on computer-readable media (e.g., in the cell phone) record magnetic field data, Wi-Fi data, RF data and/or IMU data as the survey progresses. The recorded data may include IMU data, e.g., acceleration data, gyroscope readings and/or magnetic signals readings from magnetometer. An actual user trace 404 (which may be combined with floor plan data), representing a path taken by the surveyor, may then be estimated and matched against a pre-planned path. The process may associate a defined location with each step. The locations of collected magnetic signals may be used as the basis for an interpolation process, by which values are associated with nearby locations in the floor plan.

For a given venue map (e.g., the floor plan 206 of FIG. 2), a survey plan may be created that covers all paths or portions of the venue that are of interest. The survey plan can be generated manually or by application of prescribed rules such as the right-hand or left-hand wall follower rule. The floor plan may result in some adaptation. For example, if a path is within a narrow pathway, a single survey path may be sufficient. In contrast, in an extra wide corridor or within open spaces, additional survey paths may be added to provide adequate coverage.

An actual location of a trace followed by a surveyor may be estimated using input from IMU sensors. The estimation may be performed using step detection, step length estimation and an estimation of step heading and/or direction. In one example, instead of estimating the heading direction from the magnetometer, a gyroscope may be used. Because the mobile client device may be held in any orientation and/or attitude, sensor readings may be converted from device's body frame to its north, east, down (NED) frame, which is close to the local World Coordinate System. A conversion matrix may be obtained by estimating gravitational force in device's body frame by taking average acceleration over the past several steps. Since a turn of the mobile device will be along the horizontal plane (i.e., the surveyor is walking on a floor of uniform elevation) that is perpendicular to the gravity, an estimation may be made of the turning angle by integrating the Z-axial rotation in the NED frame of the mobile device. Accordingly, a negative or positive turning angle indicates a direction change towards the left or right, respectively, regardless to the device's actual attitude.

In one example, trace matching may be used to match a trace (e.g., data) indicating actual movement of a surveyor to aspects of a survey plan and/or venue map. Trace matching may include candidate turn detection, which may be performed in part by recognizing an actual turn decision, such as by operation of techniques in dynamic programming. In one example, a running detection window (empirically set to 7 steps) may be set to a walking trace of a surveyor. In the example, a candidate turn may be identified if the sum of angle changes within the detection window exceeds a threshold. The threshold may be set as indicated by circumstances, but in one example may be about 30 degrees. A real turn may be extracted from data indicating multiple candidate turns. Additionally, several consecutive turns may be merged into a single turn, and a local search may be performed so that additional steps belonging to the same turn are included. Such inclusion ensures the integrity of the turn and improves the detection accuracy of the turning angle. The turning point may be set at a step having the sharpest angle change of the turns within the detection window.

In one example, dynamic programming may be used to match traces indicating actual movement of a surveyor to corresponding paths in a survey plan. Such matching provides an understanding of where actual measurements (e.g., magnetic strength measurements) were taken in relation to the floor plan of the venue. In the example, an estimated user trace may be matched to its corresponding pre-planned path by matching the turns in the two paths. Because turns are salient features, a comparison may be made between two lists of turns: one ground turn list (G for ground) obtained from the pre-planned survey paths and one candidate turn list (C for candidate) that represent measured turns (e.g., measured by IMU sensors).

Referring to FIG. 4, the ground and candidate turns can be described by:

$$G = \{P_{sg}, A, B, C, D, E, F, G, H, K, P_{eg}\}$$

and $$C = \{P_{sc}, T_1, T_2, T_3, \ldots, T_{12}, T_{13}, T_{14}, P_{ec}\},$$

respectively, wherein, $P_{sg}$, $P_{eg}$, $P_{sc}$ and $P_{ec}$ are the start and end points, and other terms represent turns.

In one example, the task of turn matching is essentially to optimally match the two sequences G and C. The start and end points are directly matched, and the overall length of the estimated trace is scaled to have the same length as the pre-planned path. When matching intermediate turns, there are two major sources of errors in walking trace estimation: one is walking distance error arisen from miss detection of steps or error in step length estimation and the other is the angle detection error due to instantaneous error such as hand shake, sensor drift and imperfect walking (e.g., irregular step size). To consider both error sources, the following penalty function may be used for matching the $j^{th}$ turn in C to the $i^{th}$ turn in G:

$$\epsilon(i,j) = \Delta D(i,j) + \Delta A(i,j),$$

where $\Delta D = |L_g(i) - L_c(j)|/L_g(i)$ is the relative distance difference for the $i^{th}$ path segment, and $\Delta A(i,j) = |\angle g^i - \angle c^j|/\angle g^i$ is the relative angle difference. Here, L and ∠ represents the length of a segment and the angle of a turn.

For a given penalty function, the sequence matching problem can be effectively handled using dynamic programming. In an example algorithm, FIG. 4 would generate the following optimal matching results:

$$\{P_{sc}, T_1, T_2, T_3, \text{-}, \text{-}, \text{-}, T_8, T_9, T_{10}, T_{11}, \text{-}, T_{13}, \text{-}, P_{ec}\},$$

where "-" indicates a discarded candidate turn.

After fixing positions of the turns, the location of intermediate steps may be calculated. In one example, the calculated locations may be proportional and according to an estimated step length and the overall distance between two bounding turns. Data may then be interpolated from the locations of the two bounding steps, proportional to their time differences. The final map and/or database may be constructed by extrapolating the magnetic field strength on the survey path in one or more directions until reaching the walls indicated by the floor plan. For wide corridors, multiple parallel survey paths may exist. In these cases, magnetic field strength data at intermediate locations between two survey paths are interpolated according to their distances to each bounding path. For crossroads and turning areas, the average of interpolated strengths (from different survey paths) may be used. A two-dimensional view of resulting map for an office building may show a plurality of local-specific disturbances of the indoor magnetic field.

In one example, a map may be stored as a grayscale bitmap (color scale, gradient or other data structure), with the magnetic field strength indicated by an 8-bit (or other value) integer for the position specified by its X- and Y-coordinates. To conserve storage space, all areas that are not surveyed may be treated as transparent area. This ensures more compact storage and faster transmission time when downloading the map from the cloud service. In one example, the relative size of resulting map to the actual floor plan is roughly the same as the portion of pathway area to the overall floor area.

Location Inference Engine

The location inference engine(s) resolve the location of the mobile client device 104. Similarly configured location inference engines may be present in both the cloud services 102 (i.e., location inference engine 116) and the mobile client 104 (i.e., location inference engine 130). In one example, the location inference engines use observed magnetic signals and associated anomalies. The location inference engines may also use IMU data, which may be processed using particle filtering techniques. The location inference engines may also utilize RF signals (e.g., Wi-Fi signals) opportunistically received by the mobile device 104.

The location inference engines are configured to resolve issues including distinguishing magnetic signals, different spatial sampling density due to different walking speeds by which the mobile client 104 is moved, device diversity and usage diversity, and possible lack of externally sensed absolute heading directions.

Step-Based Vectors

In one example, the ability to distinguish geomagnetic signals may be improved by increasing the size of an area over which measurements are made. Thus, by utilizing multiple temporal observations, a high dimensional vector signal may be created. The path of a user walking may increase spatial coverage of the vector signal. In a particular example, if a user-carried device observes three consecutive samples with magnitude {47, 48, 49}, there may be only two possible locations in a map or database with similar observations. Accordingly, multiple geomagnetic observations over time enhance the ability to distinguish location.

A longer trace over which a user walked while taking magnetic (and optionally, inertial measurements) that is converted into a vector will result in greater ability to discern location using geomagnetism. However, matching excessively long vectors against the samples in the database may lead to intractable complexity. This may be true in part because a user may walk using different step sizes and directional headings, and may stop from time to time. Such variations may result in geometrically or exponentially growing complexity. A step model may be used to create vectors from samples that incorporate considerations that reduce complexity. A first technique that may be utilized to reduce complexity is to limit vector comparison to vectors that cover similar spatial distances. Thus, an estimate of the spatial coverage of user-step vectors may be used. Such information is readily available from IMU-based tracking. A second technique that may be utilized to reduce complexity is to associate samples within a same step pattern with a same direction of motion. Such association is consistent with the combination of such measurements into a single vector. A third technique that may be utilized to reduce complexity is to avoid discontinuities in a user's walking gait, e.g., full steps may be utilized since it is unlikely the user will stop walking in mid-step.

Techniques in Magnetic Vector Matching

Walking-based temporal observations may lead to a spatial sampling density diversity problem. In one example, different numbers of samples may result for the same spatial coverage due to possibly different walking speeds and different temporal sampling frequencies. In an example sampling environment, faster walking may yield shorter traces and fewer signal samples, whereas slower walking may yield long traces with more samples. Thus, different spatial sampling density may result from walks covering the same path. Accordingly, vectors over the same spatial coverage may have different dimensionality. Different sampling frequencies may further complicate the walking-based temporal observations and sensor measurements. Nevertheless, different spatial sampling densities may result in similarly appearing patterns. Therefore, in one example, a dynamic time warping (DTW) algorithm may be used to measure similarity between two sequences that may vary in time and/or speed.

To address issues of device diversity and usage diversity, a simple mean removal technique may be used. In this technique, both the signal vector and the candidate vector have their mean removed before applying DTW. Such removal is warranted, despite different measured values of the same magnetic field, because the shape of resulting magnetic signal sequences may be similar for the same path. Therefore, the shape of the local magnetic field may be utilized, instead of absolute values of the field.

Thus, to match a magnetic signal vector collected in one step, a candidate vector may be configured from neighboring samples in the database such that the vectors cover the same spatial distance as the length of that step. The mean of both vectors may be removed, and DTW applied to calculate vector similarity.

Particle Motion Model

Tracking-based approaches to location finding may utilize particle filtering techniques or other signal processing techniques. Example implementations of particle filtering techniques may include definition of particle motion models. Within such a model, particles are driven or moved uniformly with external sensed absolute directions, which may be very noisy due to indoor magnetic field anomalies. Movement of the particles updates a state in the model. In one example, a user may walk in a straight line within an underground parking garage (e.g., with a phone sensing magnetic field strength in the user's pocket). In the example, the magnetic field data will be noisy, whereas gyroscopic data can reliably capture relative walking directions. Techniques that fuse magnetic and gyroscopic data (e.g., gyroscopic data obtained through a motion application programming interface (API)), may be used within an example inertial tracking system. Such a fusion may lead to better directional accuracy, but significant noise may remain in the data. In another example, techniques may utilize particle filtering, but without resolving the heading direction from a possibly disturbed magnetic field. Such techniques may utilize a gyroscope without a compass. Based on an assumption that a user is very likely to follow the main direction of the path and is very likely to continue walking in a consistent direction rather than making random turnarounds, the techniques may utilize a map-constrained, position-aware, inertial-based (MPI) particle motion model to move the particles.

FIG. 5 shows an example of an MPI motion model 500. The direction $\vec{u}$ of a newborn particle (e.g., Particle A and D) is determined by the direction $\vec{u}_{pw}$ of the pathway it is in. The direction of a re-sampled particle (e.g., Particle B and C) may be the direction of the previous step plus a relative direction change $\vec{u}_{gyro}$ ring this step. Accordingly, the model may be considered "inertial-based." The relative direction may be obtained from a gyroscope. In some instances, the gyroscope may occasional falsely indicate a conclusion of a turn, such as due to possible sudden attitude change (e.g., the user may change a hand holding the phone). However, the model 500 seldom fails to detect actual turns. Therefore, if the gyroscope indicates no turn, we may significantly reduce (or even eliminate) the possibility on the turning direction. In the example shown, Particle B will continue with no turn. In contrast, when the gyroscope indicates a turn, the probability is divided between a turn and the original direction. In the example shown, Particle C shows indications of turning and continuing in a straight line. If the turn indication is a false alarm, then the particles will soon hit the wall and die. Accordingly, map information is utilized to a significant degree. In two examples of map information utilization, walls are used to remove wrongly directed particles and the pathway directions are used to better initialize particles' direction of motion.

Augmented Particle Filter

Step-based vectors, magnetic vector matching and the particle motion model may be combined into an augmented particle filter that may execute on a step-by-step basis (i.e., as a user walks with a mobile device having magnetic field sensors). The state of a particle includes its current location $\vec{p}=\{x, y\}$ and also the heading direction $\vec{u}$. The observations may be obtained from a mobile client and include walking step information (e.g., step length and relative direction change) and the magnetic fingerprint vector elements collected during the step.

With input from a new step, a particle may be updated as follows:

$$\vec{u}'=P(\vec{u}_{pw}) \text{ for newborn particles;}$$

$$\vec{u}'=\vec{u}+\vec{u}_{gyro}+\Delta\vec{u} \text{ for re-sampling particles;}$$

and $$\vec{p}'=\vec{p}+(l+\delta)\cdot\vec{u}',$$

where $P(\vec{u}_{pw})$ is a probabilistic selection function that instantiates the direction of a newborn particle according to its position, and $\Delta\vec{u}$ is to account for possible relative direction errors that is also assumed to follow a Gaussian distribution with zero mean and variance set to ten degrees in one implementation. The term l is the estimated step length and δ accounts for the possible error of step length estimation, and assumed to obey a Gaussian distribution with zero mean and variance set to 21 in one implementation. The weight of a particle is set to $$\kappa = e^{-\frac{d^2}{2\sigma^2}}$$

where d is the resulting DTW distance, and σ is a parameter that reflects the overall disturbance intensity of the indoor magnetic field and can be trained.

Fusion of Magnetic Field Techniques with Other Technologies

Utilizing the techniques discussed above, a system can track and locate a user in an indoor environment using a magnetic field, optionally utilizing relative directions depicted as a trace of the user walking and obtained from a gyroscope. Improved accuracy can be obtained by a method that combines these technologies (utilization of magnetic fields and inertial sensors) with other localization means (e.g., Wi-Fi) to improve the location-finding accuracy. In one example, a Wi-Fi database can also be constructed using the previously discussed compliant-walking method and techniques. In the example, a map of magnetic signal data and a radio (e.g., Wi-Fi) map may be constructed simultaneously by also collecting Wi-Fi data as the magnetic signal data is collected.

One reason to combine the techniques discussed above with Wi-Fi (or other RF) based location-finding methods lies in their complementary location-finding capabilities. Wi-Fi is a short range radio system, and thus can differentiate distantly separated locations. However, Wi-Fi signals are usually similar for locations. Thus, when used alone, Wi-Fi provides limited discernibility between nearby locations. In contrast, the geomagnetic field is global. Accordingly, the geomagnetic field may provide similar measurements even between two distantly separated locations. However, the local magnetic field anomalies are more fine-grained. Therefore, if the magnetic field information and the Wi-Fi signals are considered jointly, within a location-finding process, synergistic interaction may result in better location-finding than either technology could provide individually.

Two-Pass Bidirectional Particle Filtering

Figure 6:
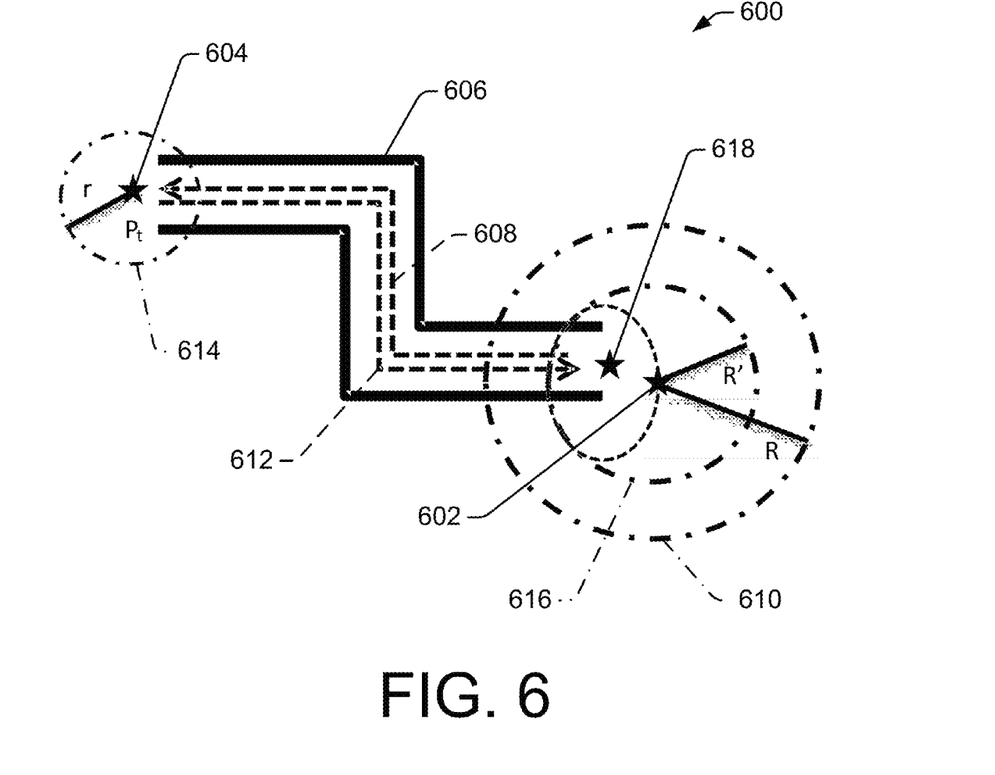
FIG. 6 is a schematic diagram showing aspects of fusion of magnetic field strength measurements with Wi-Fi measurements and two-pass bidirectional particle filtering.

FIG. 6 is a schematic diagram 600 showing techniques to fuse magnetic field strength measurements with Wi-Fi measurements. In one example, signal processing techniques, such as particle filtering, may be used to find a better location estimate of background-logged traces (e.g., the movement of a surveyor). The particle filtering techniques may include one-pass or two-pass bidirectional particle filtering (TBPF). In the TBPF example, use of an optional first pass provides additional location-fixing information. In both one- and two-pass filtering, particles may be initially distributed throughout the floor of a venue. State updates, performed during operation of the particle filtering model, move particles to refine an estimate of the location of the trace. In the example of FIG. 6, a starting location 602 (defined in calculations as $P_0$) is separated from an ending location 604 (defined in calculations as $P_t$) by a hallway or corridor 606.

When performing a location query, the location inference engine may consider a motion trace and the corresponding magnetic signals and Wi-Fi information logged as the trace was created. By using both magnetic and RF information, the location-finding process may be made more accurate. Particularly if given the correct initial location, particle filtering will converge faster and yield more accurate result. In one example, the Wi-Fi localization may be fused with the magnetic signal information through a two-pass bidirectional particle filtering process, as shown in FIG. 6.

In the first pass, a rough location estimate $P_0$ (shown at 602) may be obtained using Wi-Fi signals. Using $P_0$, backward particle filtering may be applied along the reversed direction 608 of a motion trace. The location information provided by a Wi-Fi hotspot assists in finding the true position to be near $P_0$ at 602. Therefore, an initial distribution of particles may be made only within a proximity of $P_0$, e.g., in a circle 610 centered at $P_0$ with radius R. Using the backward particle filtering process, a good estimate of the starting position $P_t$ (shown at 604) of the logged trace may be obtained. In the second pass 612, a forward particle filtering may be performed along the motion trace normally, and the particles may be initialized within a circle 614 around $P_t$ with radius r. Finally, a post-filtering process may be performed, and only the particles that fall within the circle 616 (i.e., the range R' to $P_0$) are retained. The weighted average of these particles may be obtained to determine the final localization result at 618 (which may be referred to as $P_0'$).

In example operation, the same background-logged motion trace may be used twice in the TBPF. This makes the particle filtering in the second pass biased, leading to either better or worse results. Thus, in some examples it is crucial to apply the final post-filtering process (i.e., selecting particles within radius $R_0$ to $P_0$). This selection implicitly uses some truth information, e.g., that the true location must be around $P_0$, and ensures the bias is favorable.

Example Methods

As used herein, "computer-readable media" includes computer storage media and communication media. Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer-readable instructions, data structures, program modules, or other data in a modulated data signal, such as a carrier wave. As defined herein, computer storage media does not include communication media.

Figure 7:
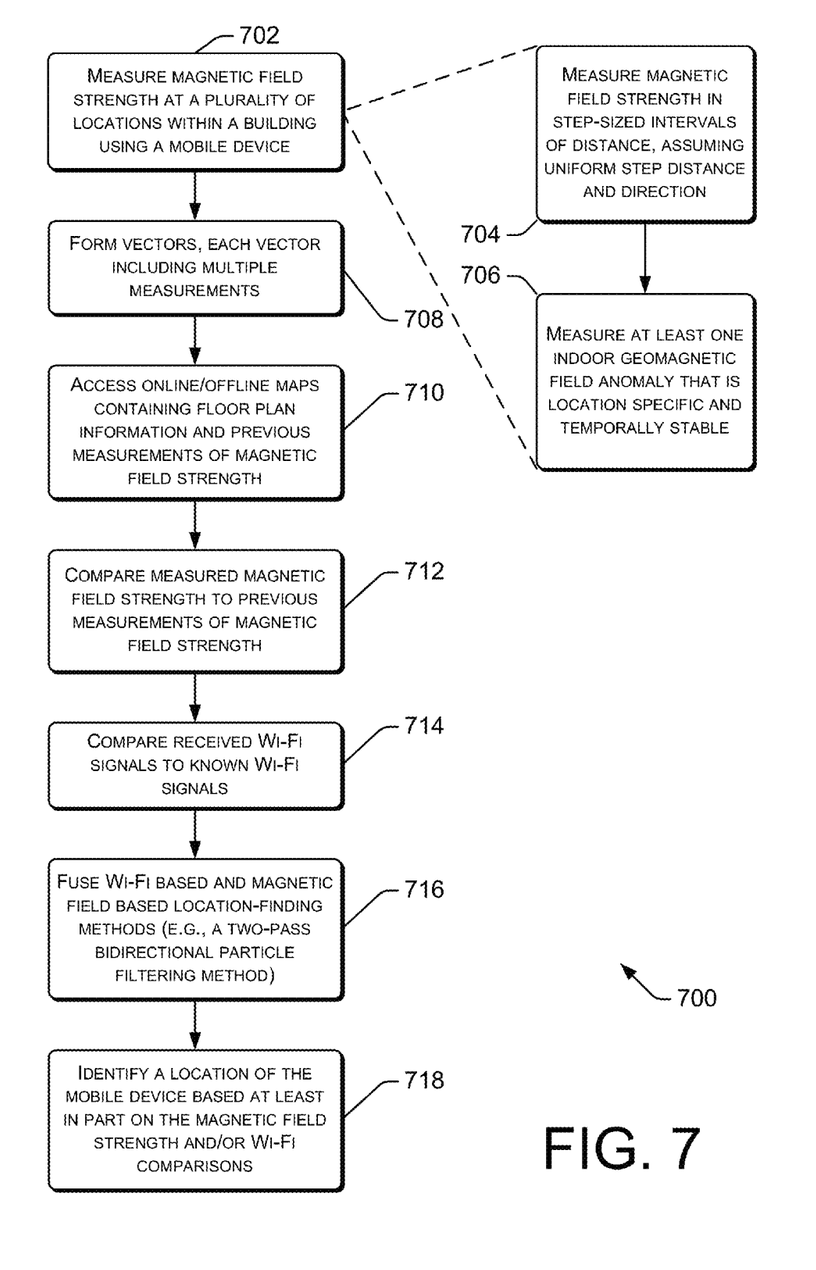
FIG. 7 is a flowchart showing an example method for indoor location-finding using magnetic field anomalies.

FIG. 7 is a flowchart showing an example method 700 for indoor location-finding, e.g., a location of a mobile device and/or client may be determined and/or reported to a user of the mobile device. In one example, the location-finding relies at least in part on detection of magnetic field anomalies. Additionally, other technologies may be utilized in synergistic combination with magnetic field measurements, such as inertial measurements, RF measurements (e.g. Wi-Fi measurements) and/or other measurements. The location-finding techniques of method 700 may be performed at least in part by a location inference engine 116 in cloud services 102 (seen at FIGS. 1 and 2), or a location inference engine 130 in a mobile client 104 (seen at FIGS. 1 and 3), or a combination of both.

In the example method 700, at block 702, magnetic field strength is measured in a plurality of locations within a building. The measurements may be made by a mobile device or client such as a cell phone, tablet, laptop, etc. The measurements may be of a magnetic field, and include measurements such as field strength, orientation, etc. In the example of FIG. 1, the mobile client 104 is moved through a building or other venue shown by floor plan 108. In a further example, magnetic field strength is measured using step-sized intervals of distance. The steps may be assumed to be of uniform step distance and uniform step direction. In some examples, vectors are formed, with each vector including multiple measurements (e.g., each measurement associated with a step of the user).

Blocks 704 and 706 show alternative and/or supplemental examples of measurements that may be taken by a mobile device. At block 704, magnetic field strength measurements may be made in step-sized (e.g., walking steps) intervals of distance. In the example of FIG. 3, the personal step model 302 may be utilized. In other examples, assumptions may be made regarding a uniform step distance and/or aspects of directional change may be made. Such assumptions may be selected to make certain calculations more manageable. At block 706, at least one indoor geomagnetic field anomaly is measured. Such an anomaly may be location specific and temporally stable. In one example, the geomagnetic field anomaly may be created by features of the venue, such as concrete and rebar, walls, metal roofs, etc., which may result in temporally steady disruption of the geomagnetic field in specific locations in a floor plan of a building.

At block 708, vectors are formed utilizing magnetic field strength information. In one example, a vector may include multiple magnetic field strength measurements. The presence of multiple measurements in a single vector provides information that may be used to more precisely indicate a location of the points in the vector.

At block 710, online and/or offline maps are accessed, such as by the location inference engine(s) of FIGS. 1-3. Generally, online maps may be accessed when the mobile device has access to the cloud services, and offline maps resident on the mobile device may be use otherwise.

At block 712, measured magnetic field strength is compared to previous measurements of magnetic field strength. In one example, the previous measurements may be contained in the on/off line maps. In another example a vector defining measurements (e.g., from block 708) is compared to a map or data base depicting at least part of a building.

At block 714, received Wi-Fi signals are compared to known Wi-Fi signals and/or transmitters. In an example, information describing the known or previously measured Wi-Fi signals may be documented on the on/off line maps.

At block 716, magnetic field and Wi-Fi based location-finding methods may be fused or otherwise combined to create a unified location-finding method. In one example, the two-pass bidirectional particle filtering methods of FIGS. 5 and/or 6 may be utilized.

At block 718, a location of the mobile device is identified, based at least in part on the magnetic field strength, and optionally based at least in part on synergistic utilization of a second technology, such as Wi-Fi measurement comparisons, other RF signals, inertial measurements, etc.

Figure 8:
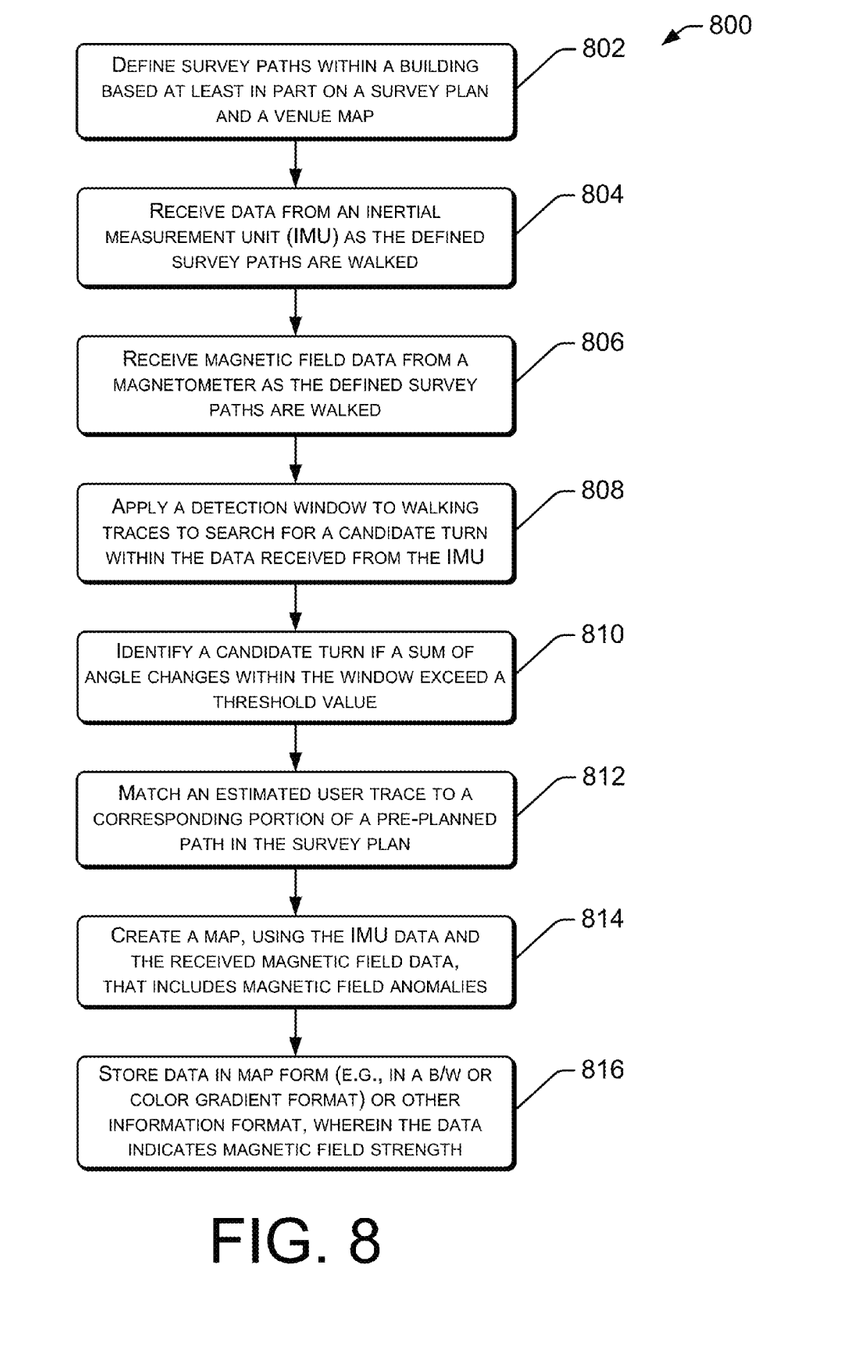
FIG. 8 is a flowchart showing an example method for construction of a map configured for indoor-location finding.

FIG. 8 is a flowchart of an example method 800 for construction of map(s), databases and/or other data structures configured to contain information adapted to use in indoor-location finding. In one example, the method 800 may be used to create and/or populate the online map(s) 118 and/or the offline map(s) 132, seen in FIGS. 1-3. At block 802, survey path(s) within a building are defined based at least in part on a survey plan and/or a venue map. In the example of FIG. 2, a floor plan 206 may be used as input when constructing the survey path(s). The survey may be created by the survey plan creator 212 of FIG. 2.

At block 804, data from an inertial measurement unit (IMU) may be received as the defined survey paths are walked. Referring to the example of FIG. 1, the venue 108 may be walked by the mobile client 104, which may include sensors 124. As seen in FIG. 3, the sensors may include an accelerometer 306 or other IMU device.

At block 806, magnetic field data from a magnetometer may be received as the defined survey paths are walked. In the example of FIG. 3, the magnetometer 316 provides a signal to the data log 314, which records magnetic field data.

At block 808, a detection window may be applied to walking traces to search for a candidate turn within the data received from the IMU. As discussed with respect to the examples of FIG. 4, a running detection window may be empirically set to a desired number of steps, and may be used in conjunction with a walking trace of a surveyor of a venue. At block 810, a candidate turn may be identified if a sum of angle changes within the window exceeds a threshold value. The sum may represent a gradual turn, taken using several walking steps, by the individual performing the survey. As discussed with respect to FIG. 4, the threshold value may be set as indicated by circumstances.

At block 812, an estimated user trace may be matched to a corresponding portion of a pre-planned path in the survey plan. FIG. 4 and associated discussion shows an example of the use of traces in the example survey method.

At block 814, a map, database or other data structure may be created, such as by using the IMU data and the received magnetic field data, which may include anomalies in the magnetic field data. In the example of FIG. 1, the database construction routine 120 may construct the map or other data structure. Detail of the data base construction routine 120 is seen in FIG. 3, including the survey plan creator 212, the user trace estimator 214 and the turn-matching tool 216.

At block 816, the survey information (e.g., the map, database and/or data structure) may be stored. The information may be stored as a map in a grayscale bitmap format, a color gradient, a database or in any desired data structure format. The map may be stored on the cloud services 102 as an online map 118 and/or the mobile client 104 as an offline map 132.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. One or more computer-readable storage media storing computer-executable instructions that, when executed, cause one or more processors to perform acts comprising:
   performing a geomagnetic field-based location-finding method by measuring geomagnetic field strength at a plurality of locations within a building using a mobile device and comparing the measured geomagnetic field strength at the plurality of locations to previous measurements of geomagnetic field strength within the building;

performing a Wi-Fi-based location-finding method by measuring Wi-Fi signals at a plurality of locations within the building using the mobile device and comparing the measured Wi-Fi signals at the plurality of locations to at least one of known Wi-Fi signals or previously measured Wi-Fi signals within the building; and fusing the geomagnetic field-based and the Wi-Fi-based location-finding methods to identify a location of the mobile device using two-pass bidirectional particle filtering.

2. One or more computer-readable storage media as recited in claim 1, wherein the comparing the measured geomagnetic field strength to previous measurements of geomagnetic field strength comprises:

comparing a vector created by the mobile device with the previous measurements, wherein the previous measurements comprise a pre-established geomagnetic signal map that describes geomagnetic field measurements within the building.

3. One or more computer-readable storage media as recited in claim 1, wherein the measured geomagnetic field strength at the plurality of locations and the previous measurements of geomagnetic field strength are based on an indoor geomagnetic field that is location specific and temporally stable.

4. One or more computer-readable storage media as recited in claim 1, additionally comprising instruction for:

accessing online maps containing floor plan information, the previous measurements of geomagnetic field strength, and at least one of known Wi-Fi signals or previously measured Wi-Fi signals; and accessing offline maps containing the previous measurements of geomagnetic field strength and at least one of known Wi-Fi signals or previously measured Wi-Fi signals.

5. One or more computer-readable storage media as recited in claim 1, wherein:

the measuring of the geomagnetic field strength at the plurality of locations comprises creating a vector indicating a plurality of geomagnetic field strength measurements; and the comparing the measured geomagnetic field strength to previous measurements of geomagnetic field strength comprises comparing the vector to a map depicting at least part of the building.

6. One or more computer-readable storage media as recited in claim 1, wherein measuring geomagnetic field strength at the plurality of locations comprises:

measuring geomagnetic field strength at step-sized intervals of distance, assuming uniform step distance, and assuming uniform step direction; and forming vectors, each vector including multiple measurements.

7. One or more computer-readable storage media as recited in claim 1, wherein the using two-pass bidirectional particle filtering to identify a location of the mobile device further comprises using a map-constrained, position-aware and inertial-based particle-motion model that performs acts comprising:

using walls indicated by map information to remove wrongly positioned and moving particles; and using pathway directions defined by the map information to initialize particles' direction of motion.

8. The computer-readable storage media as recited in claim 4, wherein at least one of the online or offline maps containing the previous measurements of geomagnetic field strength are configured in a bitmap image, wherein a gradient in the bitmap image indicates geomagnetic field strength.

9. A mobile device, comprising:

a processor in communication with memory and a video display;

instructions defined in the memory and executable by the processor, to:

perform a geomagnetic field-based location-finding method by measuring geomagnetic field strength at a plurality of locations within a building to define geomagnetic information and comparing the geomagnetic information to previous measurements of geomagnetic field strength;

perform a Wi-Fi-based location-finding method by measuring Wi-Fi signals at a plurality of locations within the building using the mobile device and comparing the measured Wi-Fi signals at the plurality of locations to at least one of known Wi-Fi signals or previously measured Wi-Fi signals within the building; and fuse the geomagnetic field-based and the Wi-Fi-based location-finding methods to identify a location of the mobile device using two-pass bidirectional particle filtering.

10. The mobile device as recited in claim 9, wherein the previous measurements of geomagnetic field strength are taken at a plurality of locations.

11. The mobile device as recited in claim 9, additionally comprising instructions to:

access a map of a geomagnetic field within a building, the map based on pre-planned survey paths followed by one or more devices receiving inertial sensor information and magnetic sensor information.

12. A system comprising the mobile device as recited in claim 9 and cloud services, wherein the mobile device has access to the cloud services, the cloud services comprising:

a database constructor configured for:

survey plan creation to create at least one survey path;

user trace estimation to estimate an actual path of a user device of a user as the user walks a survey path; and trace matching to match the user trace to aspects of a survey plan; and online maps comprising the previous measurements of geomagnetic field strength.

13. The mobile device as recited in claim 9, the using two-pass bidirectional particle filtering comprising:

performing backward particle filtering to obtain an initial distribution of particles, wherein the particles represent one possible locations of the mobile device;

performing forward particle filtering to obtain a second distribution of particles;

initializing the particles contained in the second distribution of particles;

determining a third distribution of particles comprising only particles within a radius of the estimated location; and calculating a weighted average of the third distribution of particles to determine the location of the mobile device.

14. The mobile device as recited in claim 9, wherein measuring geomagnetic field strength at the plurality of locations comprises:

measuring geomagnetic field strength at step-sized intervals of distance, assuming uniform step distance, and assuming uniform step direction; and forming vectors, each vector including multiple measurements.

15. A method, comprising:
under control of one or more processors configured with executable instructions:
  defining survey paths within a building based in part on a venue map;
  receiving data from an inertial measurement unit (IMU) as the defined survey paths are walked;
  receiving geomagnetic field data from a magnetometer as the defined survey paths are walked;
  creating a map using the IMU data and the received geomagnetic field data, wherein the created map is based at least in part on a plurality of geomagnetic field anomalies; and
  matching an estimated user trace to a corresponding portion of one of the survey paths by matching turns consistent with the one survey path to turns consistent with the received data from the IMU.

16. The method of claim 15, additionally comprising:
storing the map as a bitmap image, wherein a gradient in the bitmap image indicates geomagnetic field strength.

17. The method of claim 15, additionally comprising:
applying a detection window to walking traces to search for a candidate turn within the data received from the IMU; and
identifying a candidate turn if a sum of angle changes within the window exceeds a threshold value.

18. The method as recited in claim 15, additionally comprising calculating the location of the intermediate steps between turns.

19. The mobile device as recited in claim 15, additionally comprising at least two of a magnetometer, a gyroscope, an accelerometer, or a Wi-Fi receiver.

20. The method as recited in claim 15, wherein the created map comprises at least one of a floor plan, a database, or a data structure.

* * * * *